Figure 1:
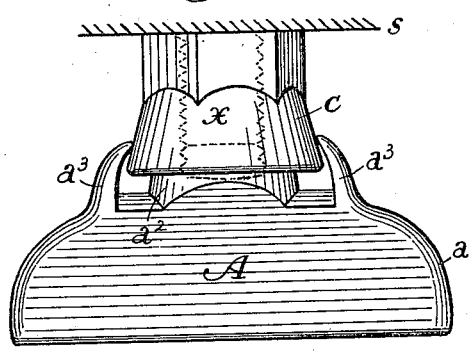

W. A. McCALLUM.
SUSPENDING DEVICE FOR TROLLEY WIRES.
APPLICATION FILED MAR. 9, 1916.

1,245,937.

Patented Nov. 6, 1917.

WITNESSES
A. L. Tildesley
Walter A. Knight

INVENTOR.
William A. McCallum
BY Lewis M. Hosea
ATTORNEY.

UNITED STATES PATENT OFFICE.

WILLIAM A. McCALLUM, OF TERRACE PARK, OHIO.

SUSPENDING DEVICE FOR TROLLEY-WIRES.

1,245,937. Specification of Letters Patent. Patented Nov. 6, 1917.

Application filed March 9, 1916. Serial No. 83,109.

*To all whom it may concern:*

Be it known that I, WILLIAM A. MCCALLUM, a citizen of the United States, residing at Terrace Park, in the county of Hamilton and State of Ohio, have invented new and useful Improvements in Suspending Devices for Trolley-Wires, of which the following is a specification.

My invention comprehends improvements in suspension devices for trolley wires of electric railways intended to simplify and cheapen the same while rendering them more efficient and durable in service.

In the present illustration, the invention is shown in its application to an overhead surface such as the ceiling of a bridge or mine, provided with a relatively fixed screwbolt depending below such surface known as the hanger-bolt. In such cases it is necessary or desirable to maintain the trolley wire close up to said surface, while permitting independent alinement of the trolley wire to exact relations with the trackage. It consists in a suspending device embodying a two-part clamp, a suspensory stud socketed in and between the clamp parts and axially countersunk and threaded to engage the hanger-bolt, and an embracing compression collar for the clamp parts, said collar being extended upward in polygonal form to embrace also a correspondingly formed head of the suspensory stud, whereby the device may be applied and attached to a fixed hanger bolt depending from an overhead surface, with absolute freedom in securing a perfect alinement, and absolute rigidity of connection when in place.

It also consists in the sleeve element as an independent feature combining in one structure independent functions; and in the ear provided with extraneous holding tongues whereby parts are held together in condition for immediate use as a protection against accidental separation and loss.

Figure 2:
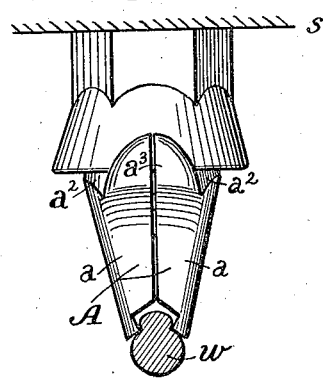
Figure 3:
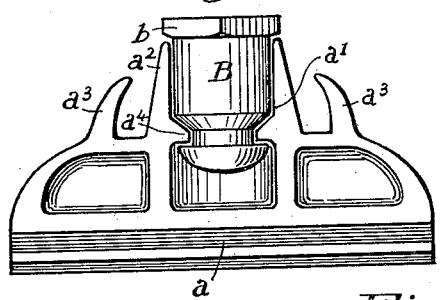
Figure 4:
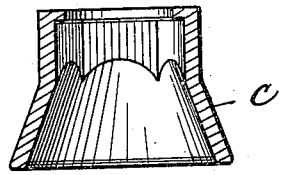
Figure 5:
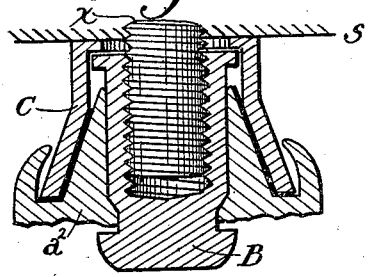

In the drawings herewith:

Figure 1 is a side-elevation of my device complete;

Fig. 2, an end view of the same;

Fig. 3, an elevation showing the inner side of one of the two clamping ears with the stud in position;

Fig. 4, a vertical axial section of the compression collar showing its polygonal extension; and Fig. 5, a vertical section of the stud and immediately adjacent parts showing their relation when drawn up in closed attachment with the suspending bolt in use.

In the accompanying drawings, A designates the "ear" or clamping device composed of two corresponding halves, $a$, $a$, formed with lower edges adapted to seat upon and engage the trolley wire $w$ (Fig. 2); and B, a stud formed as shown (Figs. 3 and 5) to rest rotatively in a corresponding engaging socket $a^1$ formed in halves between the inner sides of the ear-parts $a$, $a$; and C, the compression collar which is the immediate operating element to attach the device to the fixed suspending bolt $x$, (as shown in Fig. 5), depending from the surface S, and to draw the clamping parts of the ear together upon the trolley wire.

The ear A is provided with an upwardly extended conical shank $a^2$ (divided between the two parts, $a$), forming the inclosing wall of the socket $a^1$, containing the stud B; and is also provided with upwardly extended fins $a^3$, one at each side of the cone $a^2$ lengthwise of the device, also divided between the two parts of the ear. These fins are bent somewhat toward each other to contact with and to retain the collar C against removal (Fig. 1).

The stud B is cylindrical, provided with a circular groove near the bottom to engage a corresponding annular ledge $a^4$ of the socket wall, and terminates above in a polygonal head $b$ of slightly enlarged diameter extending over the conical shank $a^2$. The stud B is axially countersunk and threaded, as shown in Fig. 5, to engage and seat by its rotation upon the suspending screw bolt $x$ depending from the surface S (Fig. 5).

Upon and surrounding the conical upward extension $a^2$ of the trolley ear A, is seated a conical compression collar C which merges into a polygonal upper extension embracing the head $b$ of the stud B and engaging it rotatively while permitting a limited axial intermovement. The collar is free to rotate upon the ear but its polygonal extension causes the rotation of the stud B.

In attaching the device to a relatively fixed bolt X depending below a surface S, the rotation, by external means, of the collar C causes the rotation of the stud B without effect upon the ear A until, as the stud, rising by engagement with the screw threaded bolt draws the ear upward until the upper edge of the collar C contacts with the surface S. As rotation continues (the collar being held against further vertical movement), the conical shank $a^2$ of the ear A is drawn up within the flaring skirt of the collar C and the two parts of the ear are tightly clamped upon the wire W, while the friction of the collar against the surface S, and against the conical extension of the ear A, gives to the collar the function of a "jam nut" to hold all parts securely in the position indicated in Fig. 5.

It will be readily seen that up to the point where the compression of the collar against the conical extension parts of the ear A becomes extreme, the slightest irregularity in the alinement of the ear with the trackage may be corrected (and the same may be done at any time by slightly loosening the connection) for after the stud B becomes partly seated on the suspending bolt and until the collar C is in close contact with the surface S, and its function as a jam nut is developed, the ear can be freely rotated on its stud without disturbing the connection.

I claim as my invention and desire to secure by Letters Patent of the United States:

1. A suspending ear for trolley wires embodying a two-part ear; a rotatable suspending stud socketed in and between the ear parts adapted to engage a hanger-bolt; and a compression collar encircling the upper part of the ear and engaging the suspending stud in rotation.

2. A suspending ear for trolley wires embodying a two-part ear, a rotatable stud socketed in and between the ear parts, and adapted to engage the ear with a suspending bolt, said stud having a polygonal head above the ear-parts, and a compression collar seated rotatably upon the upper portions of the ear and having a polygonal extension embracing the corresponding head of the rotatable stud, in a rotative engagement.

3. As a constituent element of a composite ear of the character indicated, a compression collar consisting of a conical annulus adapted to seat upon the conical shank in which is socketed the suspending stud, said collar having an upper polygonal extension adapted to embrace and engage a corresponding polygonal portion of the suspending stud in rotation. said element being adapted by its rotation (1) to clamp the ear parts upon the trolley wire; (2) to engage the suspending stud upon the hanger bolt; and (3) to constitute a frictional "jam nut" to maintain all parts rigid in relation to each other and to the fixed hanger bolt.

In testimony whereof I have hereunto set my hand in presence of two subscribing witnesses.

WILLIAM A. McCALLUM.

Witnesses:
 WALTER A. KNIGHT,
 A. L. TILDESLEY.